US012198660B2

(12) United States Patent
Tsutaki

(10) Patent No.: US 12,198,660 B2
(45) Date of Patent: Jan. 14, 2025

(54) VIDEO PROCESSING DEVICE AND VIDEO PROCESSING METHOD

(71) Applicant: Roland Corporation, Shizuoka (JP)

(72) Inventor: Keigo Tsutaki, Shizuoka (JP)

(73) Assignee: Roland Corporation, Shizuoka (JP)

( * ) Notice: Subject to any disclaimer, the term of this patent is extended or adjusted under 35 U.S.C. 154(b) by 769 days.

(21) Appl. No.: 17/368,806

(22) Filed: Jul. 6, 2021

(65) Prior Publication Data

US 2021/0335332 A1 Oct. 28, 2021

Related U.S. Application Data

(63) Continuation of application No. 16/726,916, filed on Dec. 25, 2019, now Pat. No. 11,094,305.

(30) Foreign Application Priority Data

Dec. 28, 2018 (JP) ................................ 2018-247689

(51) Int. Cl.
*G10H 1/00* (2006.01)
*G10H 1/40* (2006.01)

(52) U.S. Cl.
CPC ............. *G10H 1/0008* (2013.01); *G10H 1/40* (2013.01); *G10H 2210/005* (2013.01); *G10H 2210/076* (2013.01); *G10H 2210/391* (2013.01)

(58) Field of Classification Search
CPC .. G10H 1/0008; G10H 1/40; G10H 2210/005; G10H 2210/076; G10H 2210/391
USPC ........................................................... 84/636
See application file for complete search history.

(56) References Cited

U.S. PATENT DOCUMENTS 5,194,682 A * 3/1993 Okamura ............. G10H 1/0066 84/645
5,583,308 A * 12/1996 Owen ...................... G10H 1/16 84/657
7,157,638 B1 * 1/2007 Sitrick ................ G09B 15/023 84/610
7,301,092 B1 * 11/2007 McNally ............... G10H 1/368 84/612
7,518,054 B2 * 4/2009 McKinney ............ G11B 27/28 704/503

(Continued)

FOREIGN PATENT DOCUMENTS

CN 102568452 7/2012
CN 104424937 3/2015

(Continued)

OTHER PUBLICATIONS

"Office Action of China Counterpart Application", issued on Jan. 12, 2024, with English translation thereof, p. 1-p. 12.

*Primary Examiner* — Christina M Schreiber
(74) *Attorney, Agent, or Firm* — JCIPRNET

(57) ABSTRACT

A video processing device, which inputs a piece of music and selects and outputs one video of a plurality of video sources, is provided. The video processing device includes a music analyzing part, which analyzes a progress of the piece of music; a video selecting part, which selects the one video from the plurality of video sources; and an output part, which outputs the one video at a timing corresponding to the progress of the piece of music that has been analyzed by the music analyzing part.

20 Claims, 14 Drawing Sheets

(56) References Cited

U.S. PATENT DOCUMENTS

| | | | | |
|---|---|---|---|---|
| 8,017,852 | B2 * | 9/2011 | Yamashita | G11B 27/28<br>84/610 |
| 9,418,643 | B2 * | 8/2016 | Eronen | G10H 1/40 |
| 11,509,820 | B2 * | 11/2022 | Yuan | H04N 23/64 |
| 2003/0024375 | A1 * | 2/2003 | Sitrick | G09B 15/002<br>84/477 R |
| 2004/0094019 | A1 * | 5/2004 | Herre | G10H 1/40<br>84/611 |
| 2005/0151834 | A1 * | 7/2005 | Yasutomo | H04N 21/44016<br>348/14.07 |
| 2005/0217462 | A1 * | 10/2005 | Thomson | G10H 1/368<br>84/612 |
| 2005/0217463 | A1 * | 10/2005 | Kobayashi | G10H 1/40<br>84/612 |
| 2010/0011939 | A1 | 1/2010 | Nakadai et al. | |
| 2010/0061466 | A1 * | 3/2010 | Gozen | H04N 21/43072<br>375/E7.026 |
| 2010/0282045 | A1 * | 11/2010 | Chen | G10H 1/40<br>84/612 |
| 2011/0023691 | A1 * | 2/2011 | Iwase | G10H 3/188<br>381/119 |
| 2011/0115979 | A1 * | 5/2011 | Aoki | H04N 9/73<br>348/602 |
| 2012/0130516 | A1 * | 5/2012 | Reinsch | G06F 17/00<br>700/94 |
| 2012/0151344 | A1 * | 6/2012 | Humphrey | G09B 5/065<br>715/716 |
| 2014/0229831 | A1 * | 8/2014 | Chordia | G11B 27/031<br>715/717 |
| 2014/0307878 | A1 * | 10/2014 | Osborne | G10H 1/0008<br>381/56 |
| 2015/0046824 | A1 * | 2/2015 | Humphrey | G10H 1/0058<br>715/727 |
| 2017/0092247 | A1 * | 3/2017 | Silverstein | G10H 1/0025 |
| 2018/0374461 | A1 * | 12/2018 | Serletic | H04N 9/8211 |
| 2019/0147838 | A1 * | 5/2019 | Serletic, II | G10L 13/027<br>704/260 |
| 2019/0156809 | A1 * | 5/2019 | Maezawa | G10H 1/361 |
| 2019/0377539 | A1 * | 12/2019 | O'Donnell | G06F 9/451 |
| 2019/0378481 | A1 * | 12/2019 | O'Donnell | G06F 1/30 |
| 2020/0211517 | A1 * | 7/2020 | Tsutaki | G10H 1/125 |
| 2020/0365125 | A1 * | 11/2020 | Senn | G06F 3/017 |
| 2021/0335332 | A1 * | 10/2021 | Tsutaki | G10H 1/125 |
| 2022/0101631 | A1 * | 3/2022 | Hata | H04N 7/183 |

FOREIGN PATENT DOCUMENTS

| | | | |
|---|---|---|---|
| JP | 2005026739 | A * | 1/2005 |
| JP | 2007052394 | | 3/2007 |

* cited by examiner

VIDEO PROCESSING DEVICE AND VIDEO PROCESSING METHOD

CROSS-REFERENCE TO RELATED APPLICATION

This application is a continuation application of and claims priority benefit of a U.S. application Ser. No. 16/726,916, filed on Dec. 25, 2019, which claims the priority of Japan patent application serial no. 2018-247689, filed on Dec. 28, 2018. The entirety of each of the above-mentioned patent applications is hereby incorporated by reference herein and made a part of this specification.

BACKGROUND

Technical Field

The disclosure relates to a technology for detecting a performance tempo of a musical instrument.

Description of Related Art

Schemes of generating one music video by imaging singing or the performance of artists and musicians at a plurality of angles and linking obtained videos are known. In the schemes, it is necessary to select appropriate cameras in accordance with the narrative of video content to be generated while pieces of music are in progress.

As a technology related to this, for example, Patent Document 1 (Japanese Patent Laid-Open No. 2005-026739) discloses a system capable of controlling switching between a plurality of cameras disposed on a stage based on a scenario stored in advance. Patent Document 2 (Japanese Patent Laid-Open No. 2005-295431) discloses a technology for recognizing the position of a person who is speaking based on speech acquired by a plurality of microphones and switching between a plurality of cameras to ascertain the speaking person.

According to the system disclosed in Patent Document 1, it is possible to perform automated switching between the cameras in accordance with a preset intention. In the disclosure, it is necessary to associate a switching timing of the cameras with any position in a piece of music. However, when a live performance of a piece of music is played, the association may not be performed in advance. There is a method of switching between cameras autonomously, but there is concern of discomfort being experienced by an audience when cameras are switched at timings irrelevant to a piece of music (for example, beats or bars).

SUMMARY

According to an embodiment of the disclosure, a video processing device which inputs a piece of music and selects and outputs one video of a plurality of video sources is provided. The video processing device includes a music analyzing part, which analyzes a progress of the piece of music; a video selecting part, which selects the one video from the plurality of video sources; and an output part, which outputs the one video at a timing corresponding to the progress of the piece of music that has been analyzed by the music analyzing part.

According to an embodiment of the disclosure, the music analyzing part analyzes the progress of the piece of music based on a configuration of the piece of music.

According to an embodiment of the disclosure, analyzing the progress of the piece of music based on the configuration of the piece of music includes analyzing the progress of the piece of music based on a beat progress of the piece of music.

According to an embodiment of the disclosure, the piece of music is a real-time-input music.

According to an embodiment of the disclosure, the analyzing performed by the music analyzing part includes cumulatively evaluating samples of the real-time-input music.

According to an embodiment of the disclosure, a video processing method, which inputs a piece of music and selects and outputs one video of a plurality of video sources, is provided. The video processing method includes: detecting an elapsed progress of the piece of music; selecting the one video from the plurality of video sources; and outputting the one video, which has been selected, at a timing corresponding to the elapsed progress of the piece of music that has been detected.

According to an embodiment of the disclosure, a video processing device, which input a sound and select and output one video from a plurality video sources, is provided. The video processing device includes: a sound input part, which inputs the sound; a video input part, which inputs the plurality of video sources; a sound detection part, which detects a periodicity of the sound that has been input by the sound input part; a video selection part, which selects the one video from the plurality of video sources that has been input by the video input part; and an output part, which outputs the one video that has been selected by the video selectin part at a timing corresponding to the periodicity of the sound that has been detected by the sound detection part.

DESCRIPTION OF THE EMBODIMENTS

Figure 1:
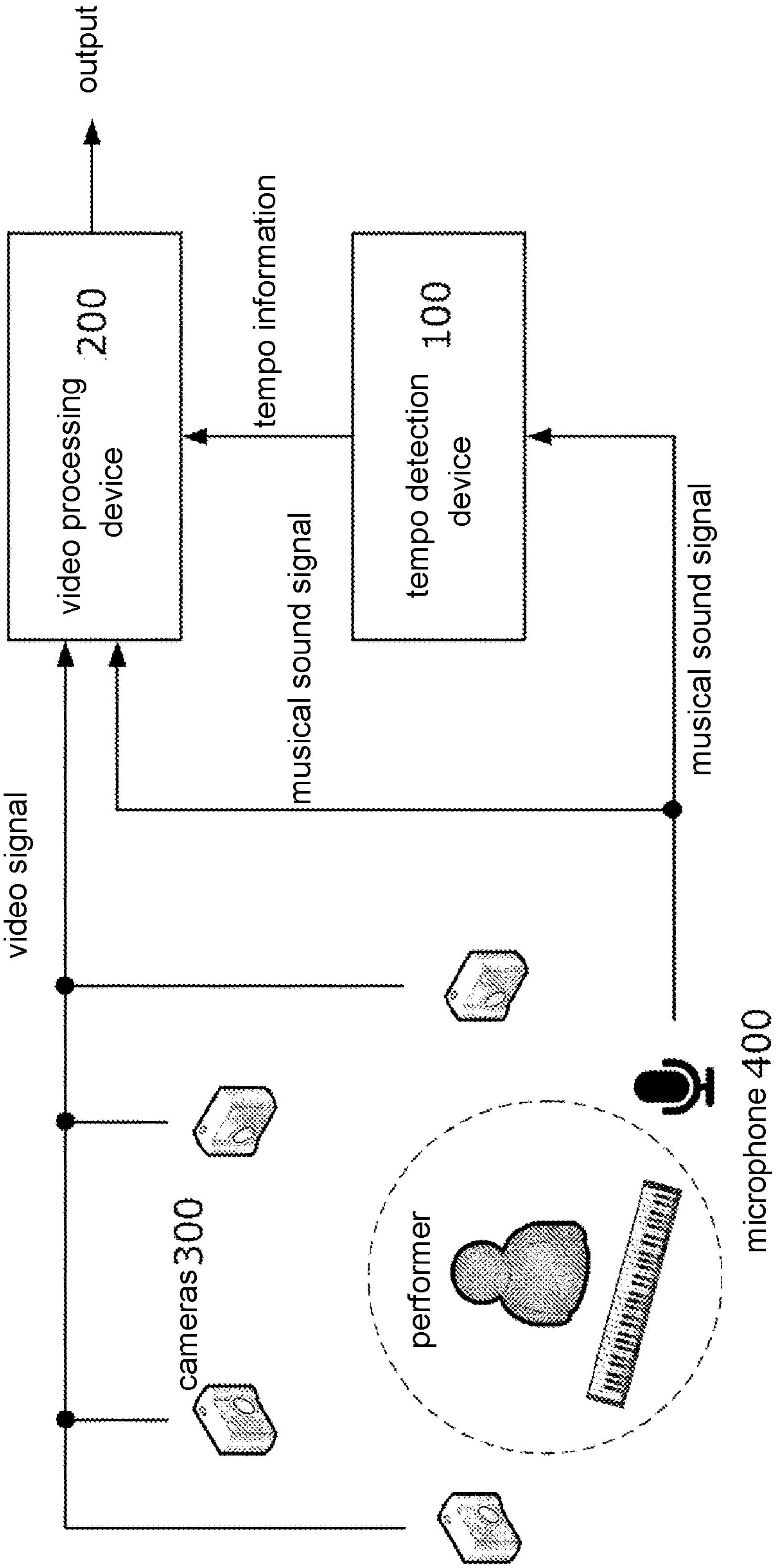
FIG. 1 is a diagram illustrating an entire video processing system.

The disclosure provides a technology for detecting a beat of a performed musical piece from a musical viewpoint.

The adaptive filter is a digital filter that dynamically updates the filter coefficient so that an error between the input signal (an evaluation target signal) and the reference signal (real signal) becomes minimum. Since a piece of music is configured to have a beat, constant periodicity is observed in the musical sound signal. Accordingly, when samples of musical sound signals with a certain interval are input as the reference signal and the input signal to the adaptive filter, the filter coefficient converges to a value in accordance with the periodicity. Accordingly, the tempo corresponding to the musical sound can be evaluated based on the converged filter coefficient.

When the filter coefficient included in the adaptive filter is a single coefficient, the converged filter coefficient is a value indicating "to what degree the set predetermined time matches a real tempo."

When the filter coefficient included in the adaptive filter includes the plurality of coefficients, the samples of the plurality of musical sound signals acquired within the predetermined period can be set an input of the adaptive filter. In this case, a timing corresponding to the real tempo can be ascertained in accordance with the value of each converged coefficient.

When there is a coefficient with the largest value among the plurality of coefficients, a sample in which the coefficient is an evaluation target is meant to be the most similar to a sample which is the reference signal. Accordingly, a time difference between the samples can be determined to be a tempo corresponding to the musical sound.

In this way, the sample group evaluated by the adaptive filter may not be included in a single period. By setting the sample group included in the first and second periods as an evaluation target, it is possible to evaluate a period which is n times the first period. That is, it is possible to perform evaluation from a musical viewpoint.

By switching between the video sources (for example, videos obtained by imaging a performer using a plurality of cameras) at timings in accordance with the detected tempos of the piece of music, it is possible to obtain a video with little discomfort.

The disclosure can be specified as an information processing device and a video processing system including at least some of the foregoing parts. The disclosure can also be specified as a method performed by the foregoing information processing device and video processing system. The disclosure can also be specified as a program causing the method to be performed or a non-transitory storage medium on which the program is recorded. The processes or parts can be freely combined to be performed as long as there are no technical contradictions therebetween.

First Embodiment

A video processing system according to the embodiment is a system in which the performance of a musical instrument by a performer is videoed by a plurality of cameras and an acquired video is reorganized and output. The video processing system according to the embodiment includes a tempo detection device 100, a video processing device 200, a plurality of cameras 300, and a microphone 400.

FIG. 1 is a diagram illustrating an entire video processing system according to the embodiment.

The cameras 300 are a plurality of cameras that are disposed around a performer who plays a musical instrument. The cameras 300 each image the performer at different angles. The cameras 300 are connected to the video processing device 200 to be described below and transmit video signals to the video processing device 200.

Sound of the performance of the performer is collected by the microphone 400, is converted into an electric signal (hereinafter referred to as a musical sound signal), and is subsequently transmitted to the video processing device 200 and the tempo detection device 100 to be described below. In this example, the sound collection by the microphone 400 is exemplified. However, when a musical sound signal can be directly acquired from an electronic musical instrument or the like, the microphone 400 may be substituted with a part that acquires a musical sound signal.

The tempo detection device 100 is a device that detects a tempo of a piece of music based on the input musical sound signal. In the embodiment, a tempo is the number of beats per minute and is expressed in beats per minute (BPM). For example, when the BPM is 120, the number of beats per minute is 120 beats. Information regarding the detected tempo is transmitted as tempo information to the video processing device 200.

Figure 2:
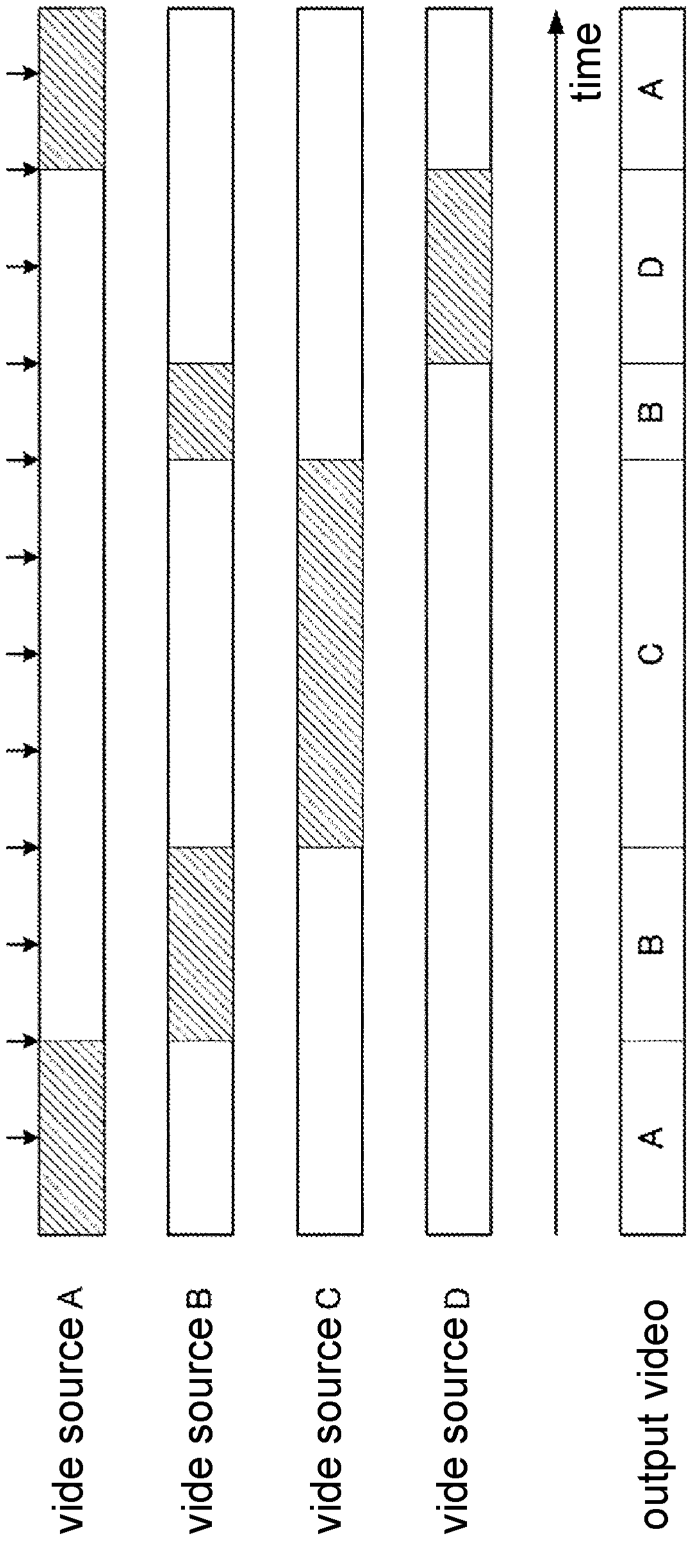
FIG. 2 is a diagram illustrating switching between video sources (cameras).

The video processing device 200 is a device that acquires and records the video signals from the plurality of connected cameras 300, reorganizes the recorded videos in accordance with a predetermined rule, and outputs the reorganized videos. Specifically, a plurality of recorded video sources is sequentially selected in a time series and the selected video sources are combined to be output, as illustrated in FIG. 2. By sequentially selecting the plurality of video sources, it is possible to switch between the plurality of cameras 300. In the following description, "switching between the video sources" is synonymous with "switching between the cameras."

The video processing device 200 perform switching between the cameras at timings (indicated by arrows in FIG. 2) matching a tempo of the piece of music which is being performed based on the tempo information acquired from the tempo detection device 100.

In this configuration, it is possible to perform switching between the cameras at natural timings synchronized with the piece of music.

Next, the tempo detection device 100 will be described in detail.

The tempo detection device 100 is a general purpose computer configured to include a central processing unit (CPU), an auxiliary storage device, and a main storage device. The auxiliary storage device stores a program to be executed by the CPU and data to be used by a control program. The program stored in the auxiliary storage device is loaded on the main storage device and is executed by the CPU, so that a process to be described below is performed.

Figure 3:
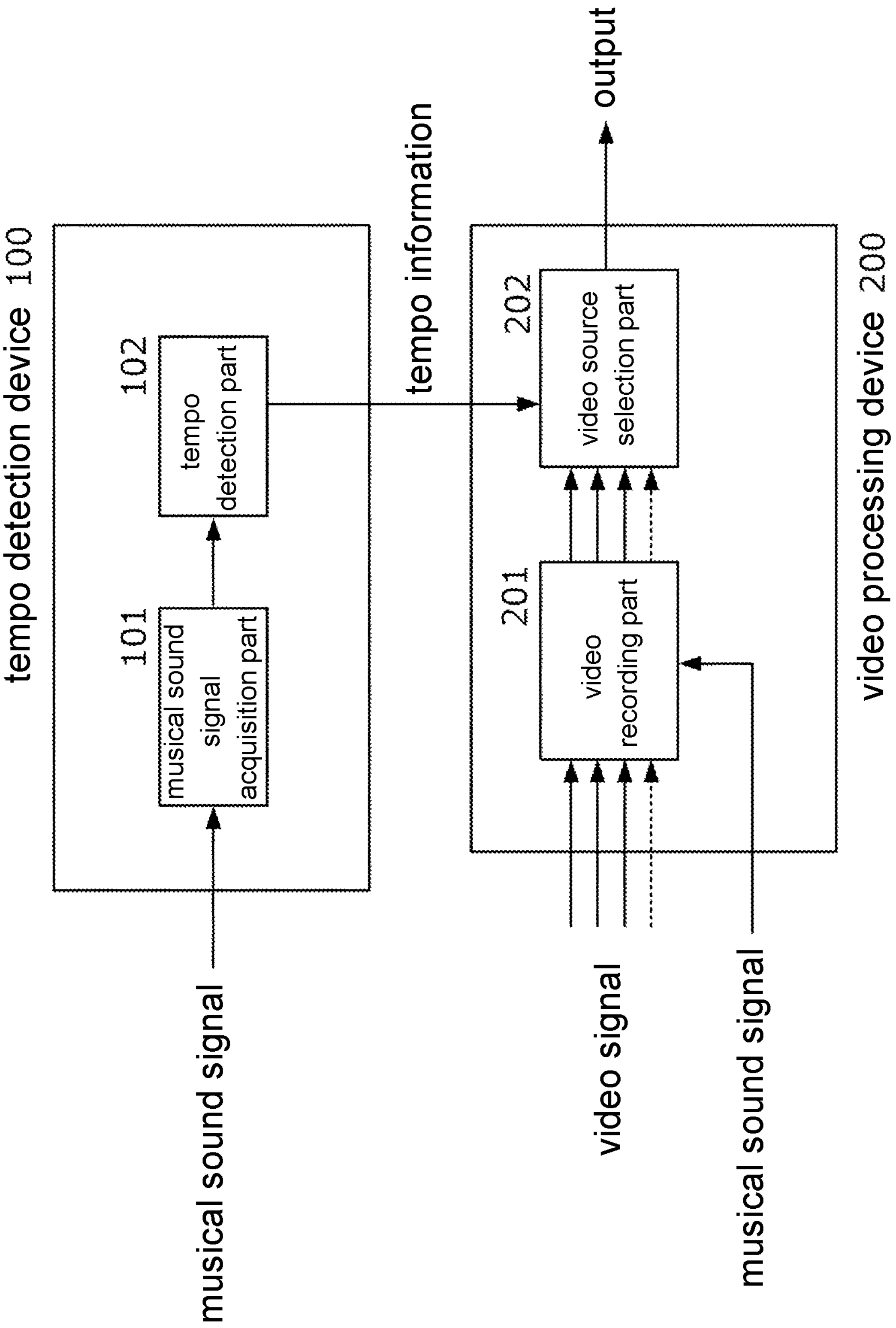
FIG. 3 is a diagram illustrating module configurations of a tempo detection device and a video processing device.

FIG. 3 is a diagram illustrating functional blocks of the tempo detection device 100 and the video processing device 200.

The tempo detection device 100 is configured to include two modules, a musical sound signal acquisition part 101 and a tempo detection part 102. The modules may be mounted as program modules that are executed by the CPU.

The musical sound signal acquisition part 101 acquires a musical sound signal which is an analog signal from the microphone 400. In the description of the present specification, a musical sound signal has a concept including both an analog signal and a digital signal obtained by sampling the analog signal.

The tempo detection part 102 samples an analog signal at a predetermined rate and detects a tempo based on the obtained digital signal. Specific processing content will be described later. The tempo detection part 102 generates information indicating a tempo of the piece of music (tempo information) and transmits the information to the video processing device 200. In the embodiment, the tempo information is information including a value (for example, 120 BPM) of the detected tempo.

Next, the video processing device 200 will be described.

The video processing device 200 is a general purpose computer configured to include a central processing unit (CPU), an auxiliary storage device, and a main storage device. The auxiliary storage device stores a program to be executed by the CPU and data to be used by a control program. The program stored in the auxiliary storage device is loaded on the main storage device and is executed by the CPU, so that a process to be described below is performed.

A video recording part 201 acquires and records video signals and a sound signal from the plurality of cameras 300 and the microphone 400. For example, when the number of cameras is 4, the video recording part 201 is connected to each of the cameras 300A, 300B, 300C, and 300D, and acquires and records a plurality of video signals (video streams). The recorded video signal is also referred to as a video source below. The video recording part 201 and the cameras 300 may be connected in a wired manner or a wireless manner.

A video source selection part 202 links (edits) the plurality of video signals recorded by the video recording part 201 using the tempo information acquired from the tempo detection part 102 to generate an output signal. The video sources may be selected in accordance with a preset predetermined rule. For example, the video source selection part 202 retains data in which association between the number of beats from performance start of a piece of music and the cameras 300 is described (hereinafter referred to as video source selection information), switches between the video sources, as illustrated in FIG. 2, at timings based on the tempo information acquired from the tempo detection device 100, and generates an output signal. As the sound signal, a common sound signal is used irrespective of the video sources.

An adaptive algorithm will be described before a principle in which the tempo detection part 102 detects a tempo is described. Since the adaptive algorithm is a known algorithm, detailed description will be omitted and only an outline of the adaptive algorithm will be described.

Figure 4:
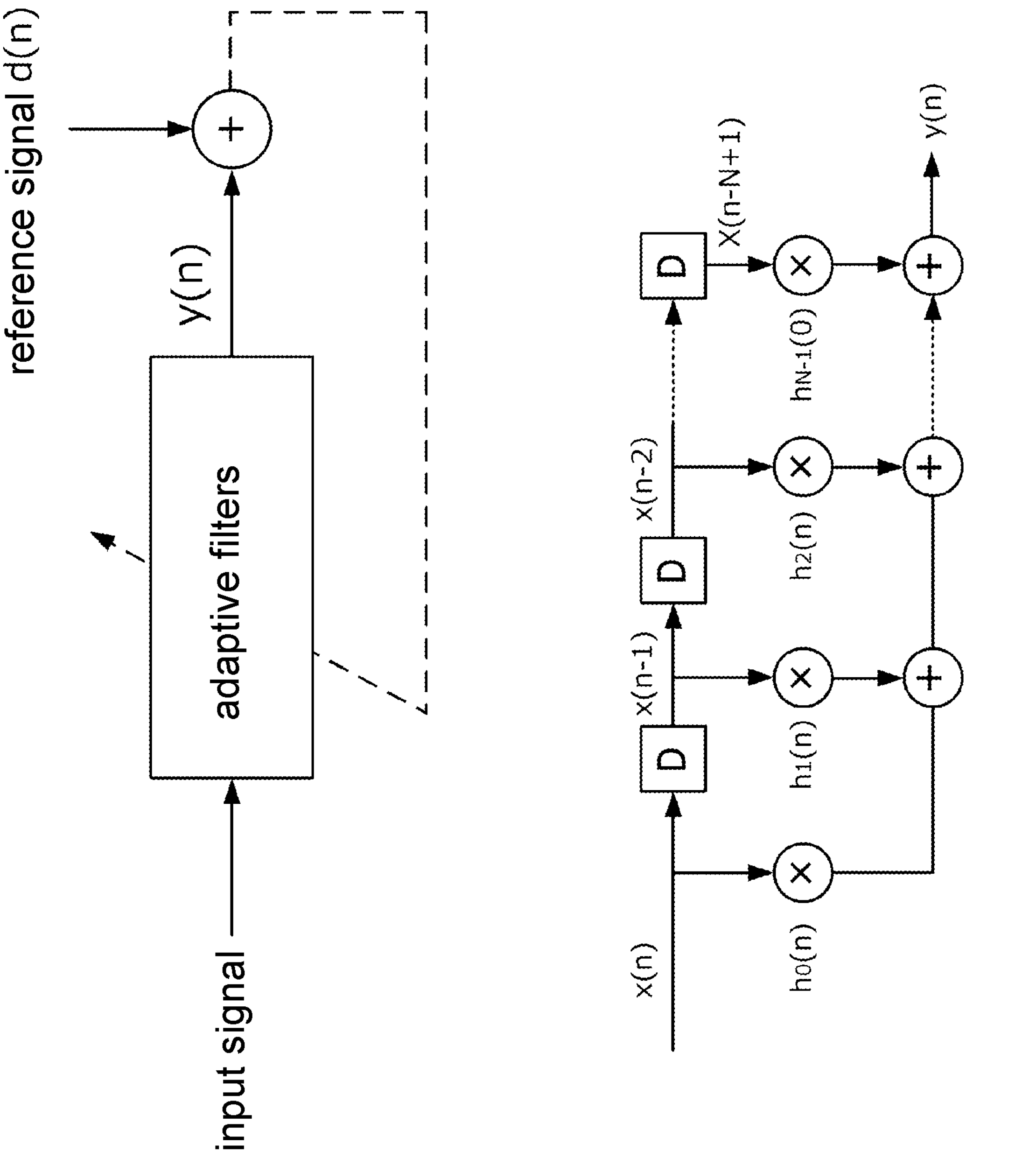
FIG. 4 is a diagram illustrating an outline of an adaptive filter.

FIG. 4 is a diagram illustrating an example of an adaptive filter configured as a finite impulse response (FIR) filter. An adaptive filter is a filter that dynamically updates filter coefficients so that an error between a reference signal and an input signal is a minimum and a sequence in which the filter coefficients are updated is referred to as an adaptive algorithm. In this example, a plurality of filter coefficients h is automatically updated so that y(n) which is an output signal approaches d(n) which is a reference signal.

Here, n indicates a time step. A case of n=0 indicates a latest time step and a case of n=−32 indicates a time step 32 steps earlier.

The tempo detection device 100 according to the embodiment calculates similarity between a processing target sample and a previous sample using characteristics of the adaptive filter.

Figure 5:
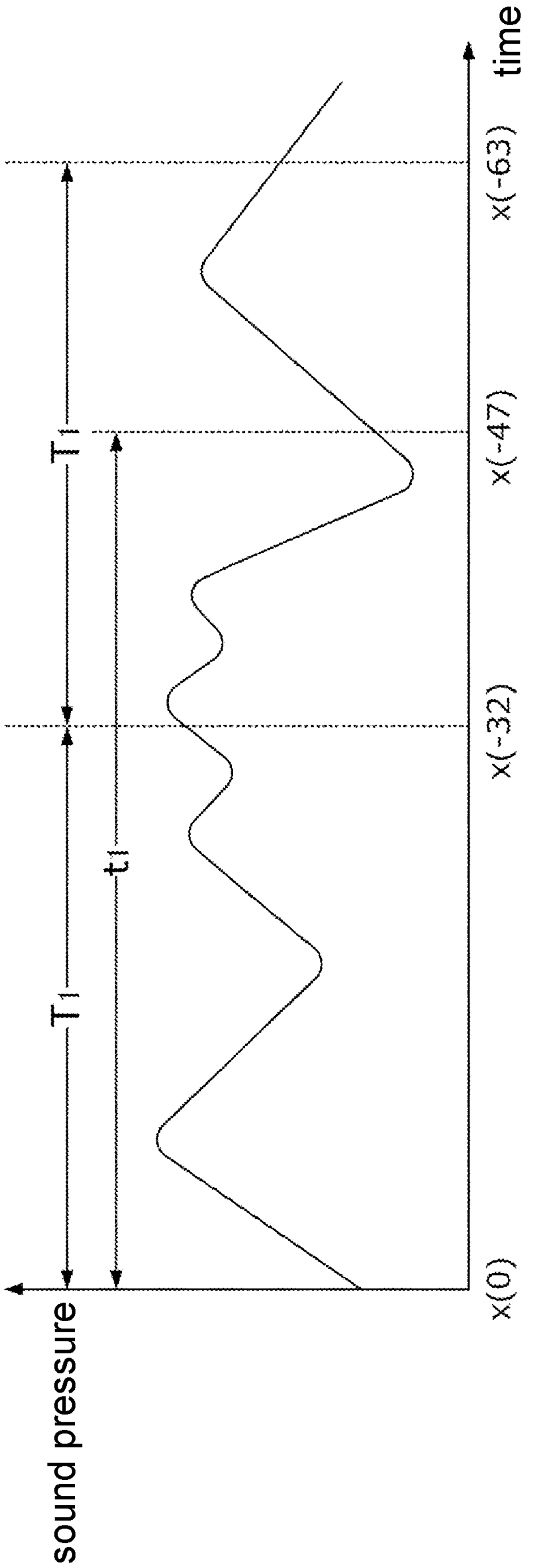
FIG. 5 is a diagram illustrating an exemplary musical sound signal which is a processing target according to a first embodiment.

FIG. 5 is a diagram illustrating a time-series musical sound signal. The horizontal axis presents a time (the past on the right side) and the vertical axis represents a sound pressure. The time is expressed by a time step corresponding to a sampling rate.

In the embodiment, a sampling part 1021 samples a musical sound signal at 44,100 Hz and subsequently performs a decimation process on the obtained signal at intervals of 512 samples. That is, a duration time of one sample is about 11.6 milliseconds. In this example, the duration time is about 371 milliseconds in 32 steps and is about 743 milliseconds in 64 steps. These times are equal to intervals of beats in the case of 160 BPM and 80 BPM, respectively.

The tempo detection part 102 detects a tempo using the adaptive filter. Specifically, the adaptive algorithm is executed using x(0) which is a latest sample as a reference signal and using x(−32) to x(−63) which are samples generated 32 steps earlier as input signals.

Figure 6A:
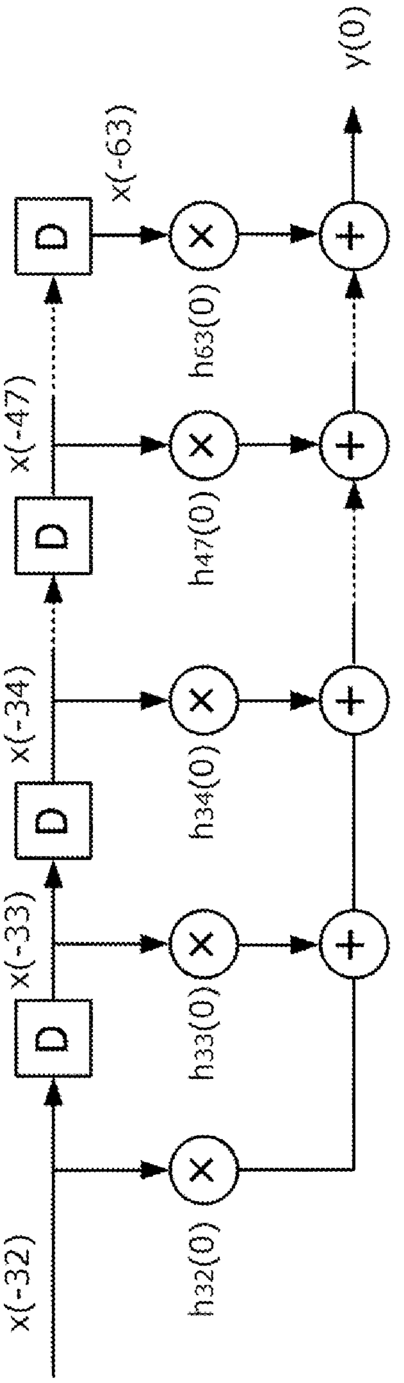
FIGS. 6(A) and 6(B) are diagrams illustrating an adaptive filter according to the first embodiment.

FIG. 6(A) is a diagram illustrating an adaptive filter included in the tempo detection part 102. As illustrated, the adaptive filter included in the tempo detection part 102 executes the adaptive algorithm using musical sound signals delayed by 32 to 63 steps as input signals.

D in the drawing indicates delay corresponding to 1 step. In the embodiment, the adaptive filter is configured to include 32 stages. That is, musical sound signals from a step 32 steps earlier to a step 63 steps earlier are evaluation targets. In the present specification, a plurality of sets (in the example of FIG. 6(A), 32 sets) of musical sound signals including delayed musical sound signals are referred to as input signals.

Figure 7:
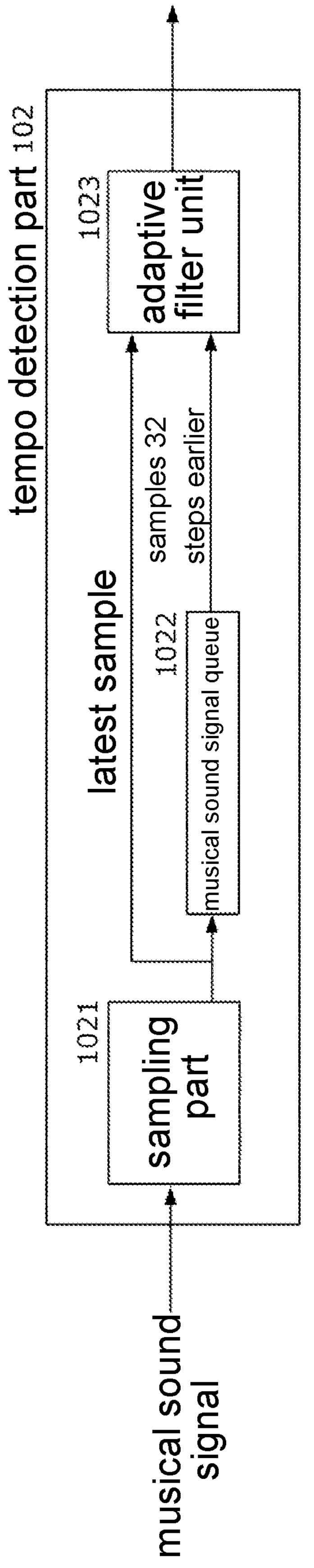
FIG. 7 is a diagram illustrating details of a tempo detection part 102 according to the first embodiment.

FIG. 7 is a diagram illustrating a module configuration of the tempo detection part 102 to realize the above-described operation.

The sampling part 1021 is a part that samples a musical sound signal at a predetermined sampling rate.

A musical sound signal queue 1022 is a part (for example, a FIFO memory) that queues musical sound signals for each sample and delays the musical sound signals by a predetermined number of time steps (in this example, 32 steps).

An adaptive filter unit 1023 is a part that is configured to include an adaptive filter and executes the adaptive algorithm. In this configuration, the adaptive filter can be provided with the latest musical sound signal and the musical sound signal at the step 32 steps earlier.

Here, when beats of a piece of music are in a section from the step 32 steps earlier to the step 63 steps earlier, it is supposed that there is a sample indicating a highest value of similarity with x(0) in one step. In other words, in the section from the step 32 steps earlier to the step 63 steps earlier, a step at which the most similar music pressure to x(0) is observed can be estimated to be a step corresponding to a beat of the piece of music.

In the example of FIG. 6(A), a signal y to be output can be expressed as in Expression (1). An error between the output signal and the reference signal is expressed as in Expression (2).

$$y(0)=h_{32}(0)x(-32)+h_{33}(0)x(-33)+ \ldots +h_{47}(0)x(-47)+ \ldots +h_{63}(0)x(-63) \quad \text{Expression (1)}$$

$$e(0)=x(0)-y(0) \quad \text{Expression (2)}$$

The calculated error is fed back to be used for updating the filter coefficients in a next time step. The following expression is an expression that determines filter coefficients in a next time step. Here, μ is a response sensitivity value obtained empirically.

$$h_{32}(1) = h_{32}(0) + \mu e(0)x(-32)$$

$$h_{33}(1) = h_{33}(0) + \mu e(0)x(-33)$$

$$\ldots$$

$$h_{63}(1) = h_{63}(0) + \mu e(0)x(-63)$$

When the musical sound signals are sequentially input to the tempo detection part 102 for each time step, the filter coefficients $h_{32}(0)$ to $h_{63}(0)$ are frequently updated to converge to a certain state.

Since the adaptive algorithm updates the filter coefficients h so that an error between the input signal and the reference signal is a minimum, the filter coefficient h corresponding to the step at which the most similar sound pressure to the sample at x(0) is observed is the largest. For example, when the step corresponding to a beat of the piece of music is normally located 47 steps earlier, $h_{47}(0)$ among the filter coefficients from $h_{32}(0)$ to $h_{63}$ (0) is the largest among the other filter coefficients. That is, a position at which there is a beat can be estimated referring to the filter coefficients in the converging state.

The filter coefficient h indicates similarity of a sound pressure for each time step.

Figure 8:
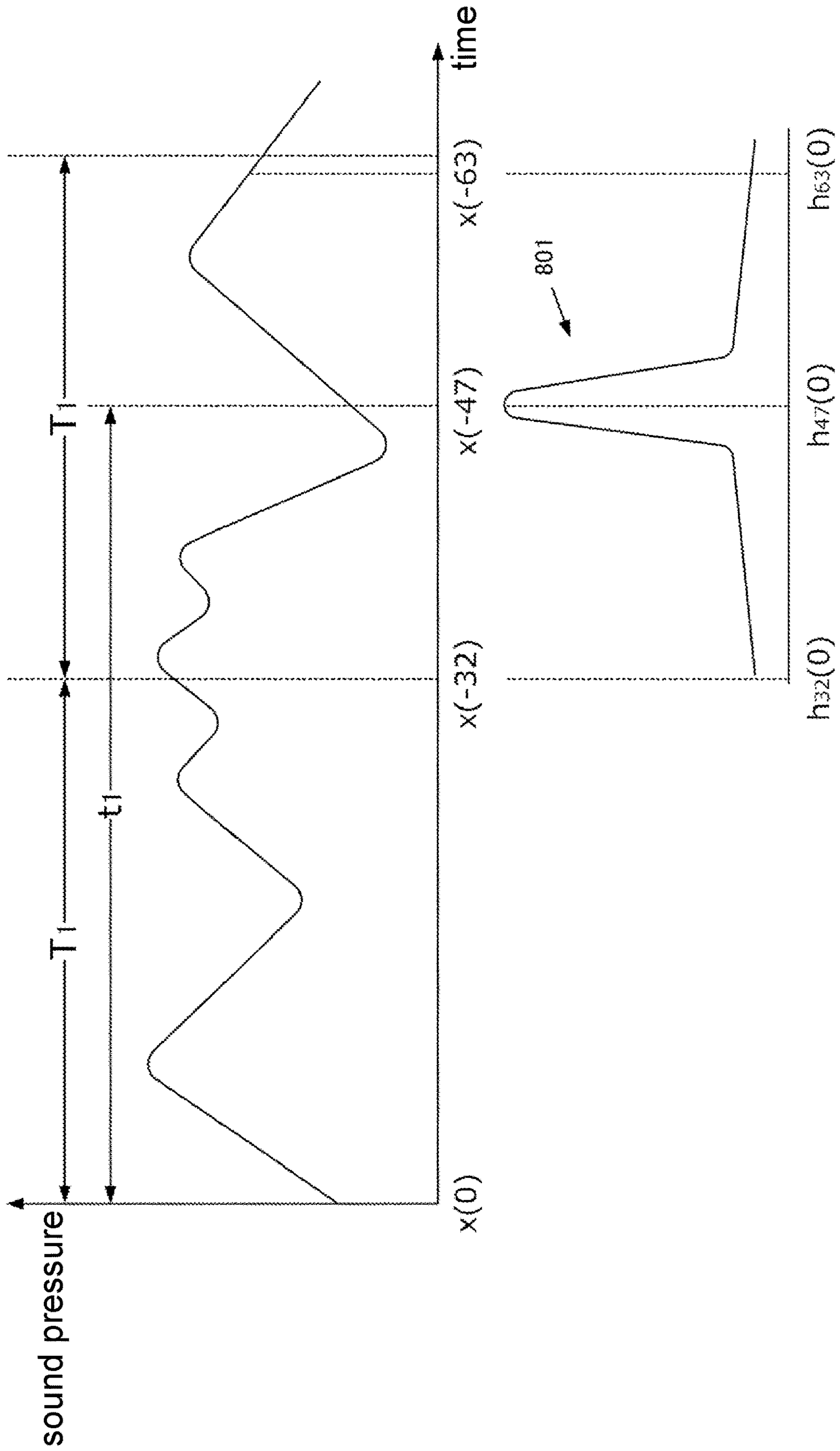
FIG. 8 is a diagram illustrating an evaluation result of a tempo according to the first embodiment.

FIG. 8 is a diagram illustrating a relation between a time step and a converging filter coefficient. In this example, the filter coefficient $h_{47}(0)$ corresponding to a step 47 steps earlier can be understood to be larger than any filter coefficient corresponding to the other steps. Since this means that a similar sound pressure to x(0) is observed 47 steps earlier, a period t1 illustrated in the drawing can be estimated to correspond to a beat of the piece of music. For example, when t1 is 500 milliseconds, a tempo of the piece of music can be estimated to be 120 BPM.

In this example, steps from the step 32 steps earlier to the step 63 steps earlier are set as evaluation targets. That is, T1 in FIG. 8 is a section for performing evaluation. It is necessary for T1 to have a length including an assumed tempo. As described above, a time length of 0 to 32 steps corresponds to 160 BPM and a time length of 0 to 63 steps corresponds to 80 BPM. The tempo detection device according to the embodiment detects a tempo in this section (that is, a range of BPM=80 to 160). The section T1 may be set appropriately in accordance with the assumed tempo of the piece of music. The length of T1 can be adjusted in accordance with a sampling rate of the musical sound signal, the length of the musical sound signal queue 1022, the number of stages of the adaptive filter, and the like.

Figure 9:
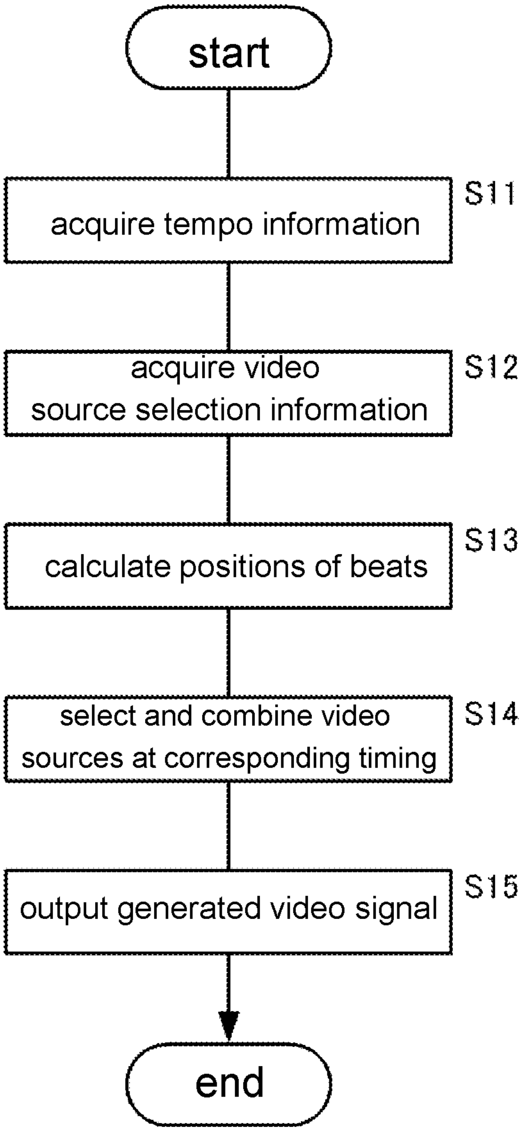
FIG. 9 is a flowchart illustrating a process performed by the video processing device according to the first embodiment.

A value (t1) determined by the tempo detection part 102 is transmitted to the video processing device 200 (the video source selection part 202) to generate an output signal. FIG. 9 is a flowchart illustrating a process performed by the video source selection part 202. The process is performed at a timing at which the recording of the video signal and the musical sound signal ends and the tempo detection process by the tempo detection device 100 ends.

First in step S11, the tempo information is acquired from the tempo detection part 102. The tempo information may include information regarding a time stamp or the like in addition to a value indicating the tempo of the piece of music. For example, the tempo information may include information indicating a performance start timing of the piece of music.

Subsequently, in step S12, the video source selection information is acquired. The previously stored video source selection information may be acquired or the video source selection information may be acquired via a user.

Subsequently, in step S13, positions of the beats of the piece of music are calculated. For example, the positions of the beats can be calculated with reference to the time stamp included in the tempo information.

Subsequently, in step S14, the plurality of recorded video sources is combined based on the video source selection information and the positions of the beats calculated in step S13 to generate new video signals.

The generated video signals are output in step S15. The video signals may be transmitted to an external device or may be recorded in a storage medium.

As described above, the video processing system according to the first embodiment can calculate a tempo of the piece of music based on periodicity of a waveform of the musical sound signal. Since the videos can be combined in synchronization with the positions of the beats, camera work in which discomfort is less can be realized.

Second Embodiment

In the first embodiment, the tempo detection device 100 has evaluates the periodicity of the musical sound signal included during the period T1. On the other hand, a second embodiment is an embodiment in which periodicities of musical sound signals included during a plurality of different periods (T1 and T2), the periodicities are integrated to determine a tempo of a piece of music.

In the tempo detection device 100 according to the second embodiment, only a configuration of the tempo detection part 102 is different from that of the first embodiment. Hereinafter, differences will be described.

Figure 10:
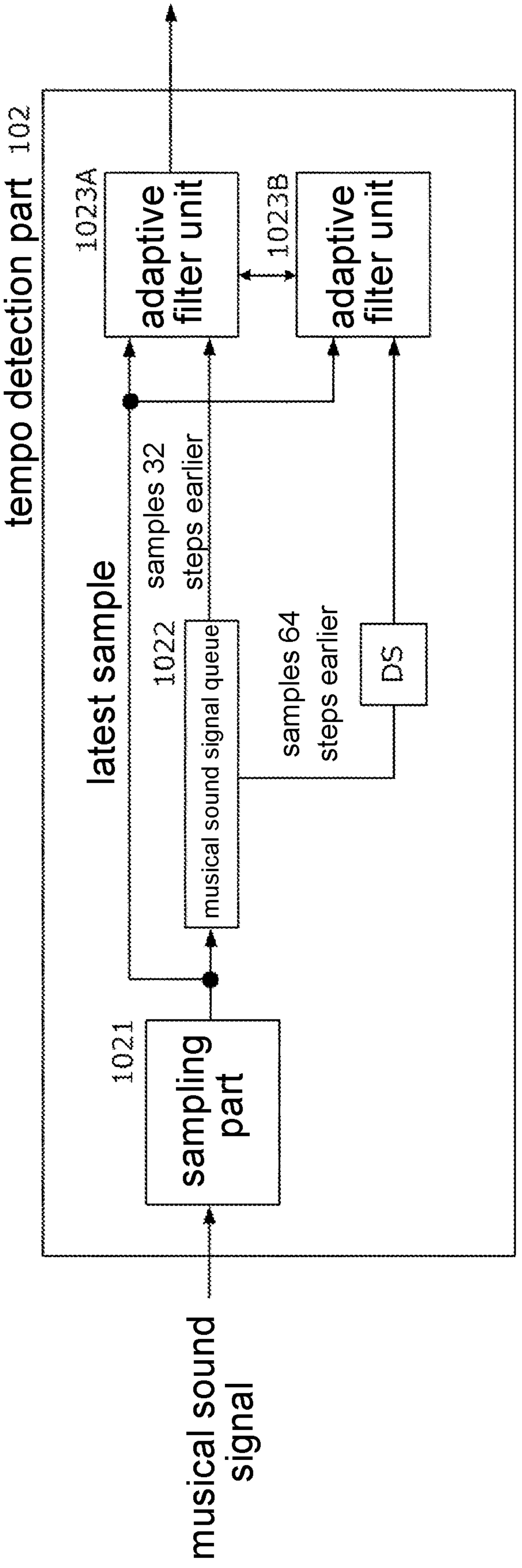
FIG. 10 is a diagram illustrating details of a tempo detection part 102 according to a second embodiment.

FIG. 10 is a diagram illustrating a module configuration of a tempo detection part 102 according to the second embodiment. In the second embodiment, the musical sound signal queue 1022 has a length of 64 steps, supplies a sample delayed by 32 steps to an adaptive filter unit 1023A, and supplies a sample delayed by 64 steps to an adaptive filter unit 1023B. DS in the drawing means that down-sampling of ½ is performed (samples are decimated to ½).

The adaptive filter unit 1023A is a unit evaluating the period T1 in the first embodiment and the adaptive filter unit 1023B is a unit evaluating the period T2 which has a double length of the period T1.

Figure 11:
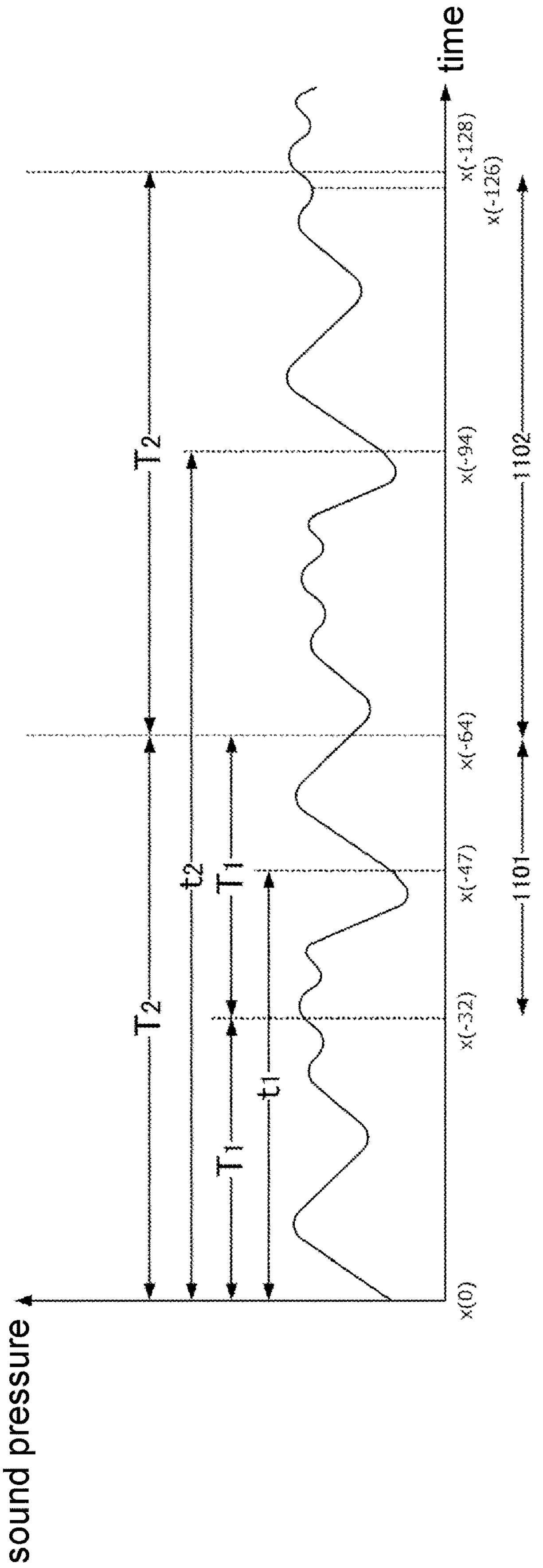
FIG. 11 is a diagram illustrating an exemplary musical sound signal which is a processing target according to the second embodiment.

FIG. 11 is a diagram illustrating a time-series musical sound signal according to the embodiment.

In the above-described configuration, when the latest sample is x(0), the adaptive filter unit 1023A processes samples in the section of the length T1 denoted by reference sign 1101. The adaptive filter unit 1023B processes samples in the section of the length T2 denoted by reference sign 1102.

A period indicated by T1 is a first period and a period indicated by T2 is a second period. In the embodiment, the length of T2 is twice the length of T1. In this way, a timing before one beat earlier and a timing two or more beats earlier can be detected.

Figure 12:
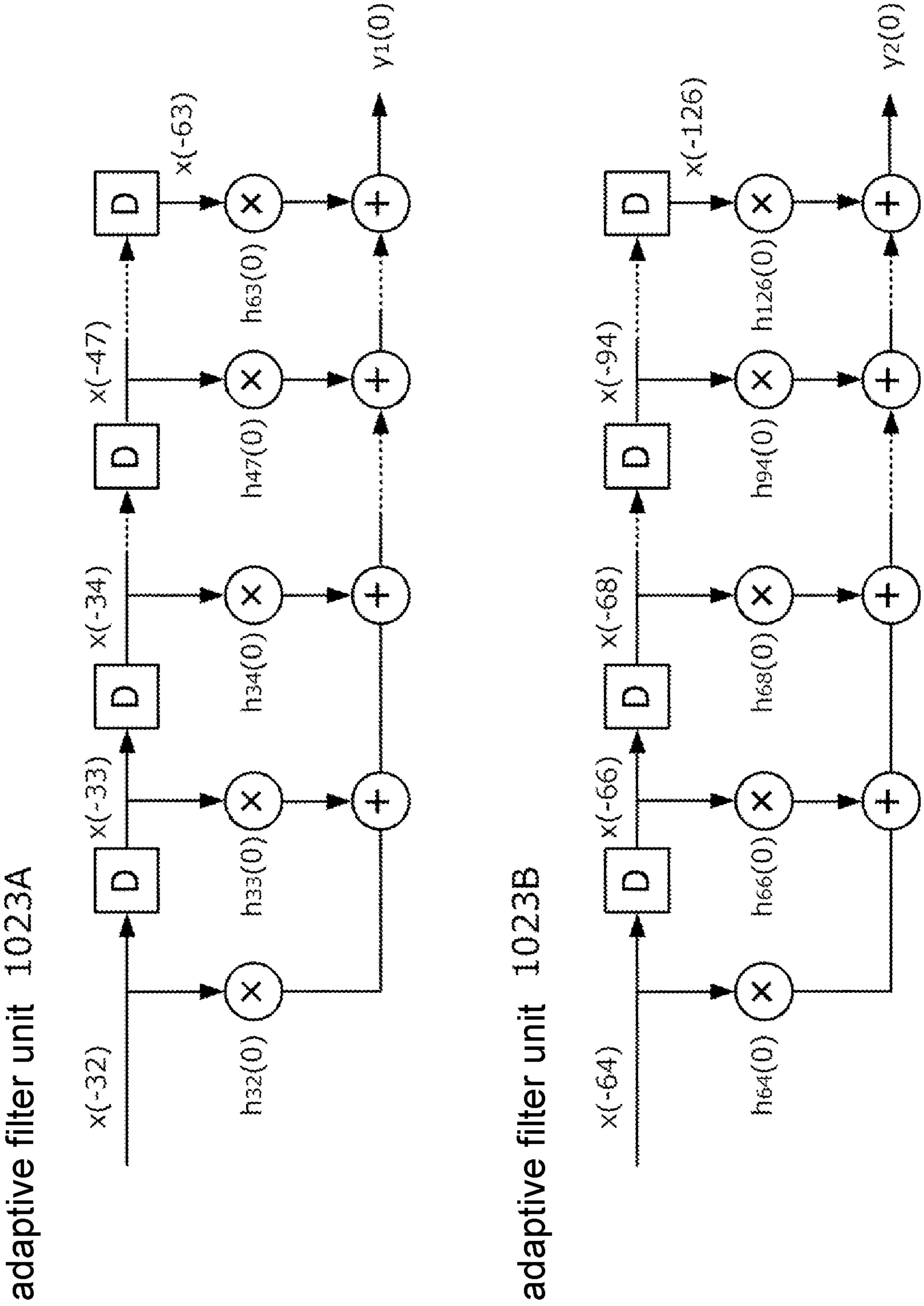
FIG. 12 is a diagram illustrating an adaptive filter according to the second embodiment.

FIG. 12 is a diagram illustrating the adaptive filters according to the embodiment. As illustrated in FIG. 11, in the adaptive filter unit 1023A, a musical sound signal (a total of 32 steps) from a step 32 steps earlier to a step 63 steps earlier is an evaluation target. In the adaptive filter unit 1023B, a musical sound signal (a total of 32 steps) from a step 64 steps earlier to a step 126 steps earlier is an evaluation target. Since the musical sound signal input to the adaptive filter unit 1023B is down-sampled to ½, a period of the evaluation target is twice and a sampling interval is ½.

In the example of FIG. 12, when $y_1$ is an output signal from the adaptive filter unit 1023A, the output signal can be expressed as in Expression (3). An error between the output signal and the reference signal is expressed as in Expression (4).

$$y_1(0)=h_{32}(0)x(-32)+h_{33}(0)x(-33)+\ldots+h_{63}(0)x(-63) \quad \text{Expression (3)}$$

$$e_1(0)=x(0)-y_1(0) \quad \text{Expression (4)}$$

When $y_2$ is an output signal from the adaptive filter unit 1023B, the output signal can be expressed as in Expression (5). An error between the output signal and the reference signal is expressed as in Expression (6).

$$y_2(0)=h_{64}(0)x(-64)+h_{66}(0)x(-66)+\ldots+h_{126}(0)x(-126) \quad \text{Expression (5)}$$

$$e_2(0)=x(0)-y_2(0) \quad \text{Expression (6)}$$

Here, the filter coefficients in Expression (5) are substituted with the filter coefficients in the adaptive filter unit 1023A. As a result, the output signal is expressed as in Expression (7).

$$y_2(0)=h_{32}(0)x(-64)+h_{33}(0)x(-66)+\ldots+h_{64}(0)x(-126) \quad \text{Expression (7)}$$

In the second embodiment, an expression by which the adaptive filter unit 1023A updates the filter coefficients $h_{32}$ to $h_{63}$ is described as follows. Parentheses are independent terms in the embodiment.

$$h_{32}(1)=h_{32}(0)+\mu_1e_1(0)x(-32)+[\mu_2e_2(0)x(-64)]$$

$$h_{33}(1)=h_{33}(0)+\mu_1e_1(0)x(-33)+[\mu_2e_2(0)x(-66)]$$

$$\ldots$$

$$h_{63}(1)=h_{63}(0)+\mu_1e_1(0)x(-63)+[\mu_2e_2(0)x(-126)]$$

That is, in the second embodiment, when the adaptive filter unit 1023A updates the filter coefficients, a correction result of the filter coefficients by the adaptive filter unit 1023B is added. In other words, a result of the determination of the similarity performed during the period T2 by the adaptive filter unit 1023B is added to a result of the determination of the similarity performed during the period T1 by the adaptive filter unit 1023A.

In the first embodiment, the value of the tempo has been calculated from the mathematical viewpoint, but the value of the mathematically calculated tempo does not necessarily match the value of the musical tempo (an intrinsic tempo of the piece of music) in some cases. For example, depending on a configuration of a piece of music, a section in which a tempo is heard at 120 BPM and a section in which a tempo is heard at 60 BPM coexist in some cases. For example, when a ringing way of percussion before and after a musical interlude is changed, an estimation result of a tempo may change despite an unchanged tempo of a piece of music in some cases. In the first embodiment, when a piece of music determined to be mathematically at 120 BPM enters a section determined to be at 60 BPM, the converging filter coefficients are changed again and correct tempo determination may not be performed in some cases. This is because the shape of a peak denoted by reference sign 801 in FIG. 8 is changed.

In the second embodiment, however, periodicity of a musical sound signal during the period T1 and periodicity of a musical sound signal during the period T2 (of which a length is twice the length of T1) are added for evaluation. In this configuration, even when a sound with a half of a tempo is temporarily heard, the cumulatively evaluated filter coefficients are not considerably changed. That is, a tempo of a piece of music can be determined by adding not only the mathematical viewpoint but also the musical viewpoint.

Third Embodiment

In the second embodiment, two adaptive filter units have been used to evaluate the periodicities of the musical sound signals during the periods T1 and T2. However, a third embodiment is an embodiment in which four adaptive filter units are used to evaluate four periods.

In the tempo detection device 100 according to the third embodiment, only a configuration of the tempo detection part 102 is different from that of the second embodiment. Hereinafter, differences will be described.

Figure 13:
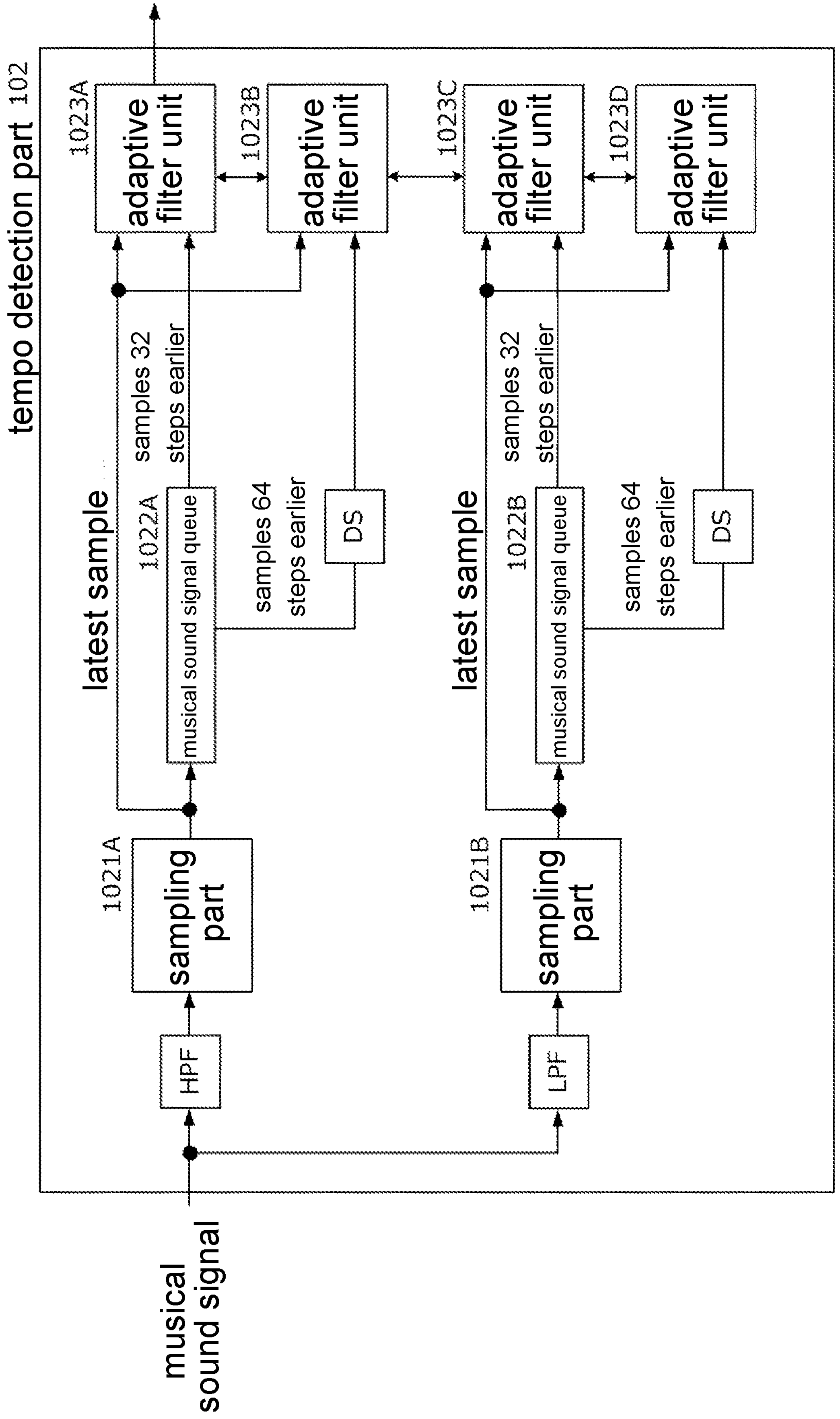
FIG. 13 is a diagram illustrating details of a tempo detection part 102 according to the third embodiment.

FIG. 13 is a diagram illustrating a module configuration of the tempo detection part 102 according to the third embodiment. In the third embodiment, an input musical sound signal is separated into two systems to pass through a highpass filter (HPF) and a lowpass filter (LPF). A musical sound signal of a high sound area is input to a sampling part 1021A and a musical sound signal of a low sound area is input to a sampling part 1021B.

The sampling part 1021A samples a musical sound signal at 44,100 Hz and subsequently performs a process of decimating the obtained signal for every 512 samples as in the sampling part 1021. The sampling part 1021B samples a musical sound signal at 44,100 Hz and subsequently performs a process of decimating the obtained signal for every 2048 samples.

Musical sound signal queues 1022A and 1022B have a length corresponding to 64 steps as in the second embodiment. Reference sign DS is a part that performs down-sampling as in the second embodiment.

In the third embodiment, the musical sound signal processed in this way is input to each of four adaptive filter units 1023A to 1023D.

Figure 14:
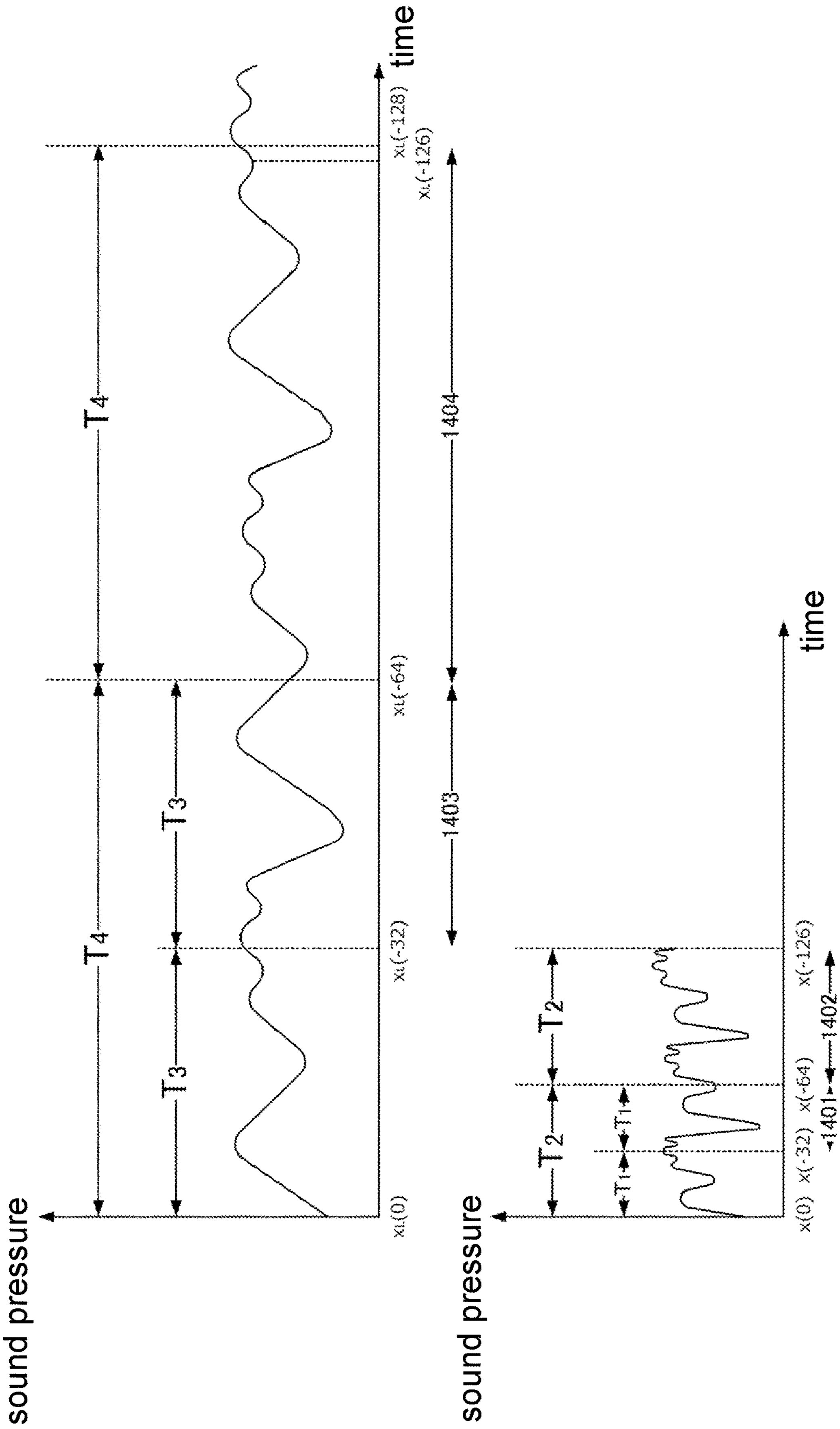
FIG. 14 is a diagram illustrating an exemplary musical sound signal which is a processing target according to the third embodiment.

FIG. 14 is a diagram illustrating ranges of musical sound signals processed by the adaptive filter units 1023A to 1023D.

The adaptive filter unit 1023A is a unit evaluating a step 32 steps earlier to a step 63 steps earlier (a range denoted by reference sign 1401) and the adaptive filter unit 1023B is a unit evaluating a step 64 steps earlier to a step 126 steps earlier (a range denoted by reference sign 1402). These units are the same as those of the second embodiment.

The adaptive filter unit 1023C is a unit evaluating a step 32 steps earlier to a step 64 steps earlier in a low sound area (a range denoted by reference sign 1403: here, since a sampling rate of the low sound area is ¼ of that of a high sound area, one step of the low sound area is equivalent to four steps of the high sound area).

Similarly, the adaptive filter unit 1023D is a unit evaluating a step 64 steps earlier to a step 126 steps earlier in a low sound area (a range denoted by reference sign 1404).

In the following description, a musical sound signal of the low sound area is denoted by $x_L(n)$ and is distinguished from a musical sound signal x(n) of the high sound area.

Here, when $y_3$ is an output signal from the adaptive filter unit 1023C, the output signal can be expressed as in Expression (8). An error between the output signal and the reference signal is expressed as in Expression (9).

$$y_3(0)=h_{L32}(0)x_L(-32)+h_{L33}(0)x_L(-33)+\ldots+h_{L63}(0)x_L(-63) \quad \text{Expression (8)}$$

$$e_3(0)=x_L(0)-y_3(0) \quad \text{Expression (9)}$$

When $y_4$ is an output signal from the adaptive filter unit 1023D, the output signal can be expressed as in Expression (10). An error between the output signal and the reference signal is expressed as in Expression (11).

$$y_4(0)=h_{L64}(0)x_L(-64)+h_{L66}(0)x(-66)+\ldots+h_{L126}(0)x_L(-126) \quad \text{Expression (10)}$$

$$e_4(0)=x_L(0)-y_4(0) \quad \text{Expression (11)}$$

Here, the filter coefficients in Expression (8) are substituted with the filter coefficients in the adaptive filter unit 1023A. As a result, the output signal is expressed as in Expression (12).

$$y_3(0)=h_{32}(0)x_L(-32)+h_{33}(0)x_L(-33)+\ldots+h_{63}(0)x_L(-63) \quad \text{Expression (12)}$$

Here, the filter coefficients in Expression (10) are substituted with the filter coefficients in the adaptive filter unit 1023A. As a result, the output signal is expressed as in Expression (13).

$$y_4(0)=h_{32}(0)x_L(-64)+h_{33}(0)x_L(-66)+\ldots+h_{63}(0)x_L(-126) \quad \text{Expression (13)}$$

In the third embodiment, an expression by which the adaptive filter unit 1023A updates the filter coefficients $h_{32}$ to $h_{63}$ is described as follows. Parentheses are independent terms in the embodiment.

$$h_{32}(1) = h_{32}(0) + \mu_1 e_1(0)x(-32) + [\mu_2 e_2(0)x(-64) + \mu_3 e_3(0)x_L(-32) + \mu_4 e_4(0)x_L(-64)]$$

$$h_{33}(1) = h_{33}(0) + \mu_1 e_1(0)x(-33) + [\mu_2 e_2(0)x(-66) + \mu_3 e_3(0)x_L(-33) + \mu_4 e_4(0)x_L(-66)]$$

$$\ldots$$

$$h_{63}(1) = h_{63}(0) + \mu_1 e_1(0)x(-63) + [\mu_2 e_2(0)x(-126) + \mu_3 e_3(0)x_L(-63) + \mu_4 e_4(0)x_L(-126)]$$

That is, in the third embodiment, when the adaptive filter unit 1023A updates the filter coefficients, correction results of the filter coefficients by the adaptive filter units 1023B, 123C, and 123D is added. In other words, results of the determination of the similarity performed during the periods T2, T3, and T4 by the adaptive filter units 1023B, 123C, and 123D are added to a result of the determination of the similarity performed during the period T1 by the adaptive filter unit 1023A.

In the third embodiment, the periods T2, T3, and T4 are equivalent to the second period. The length of the periods T2, T3, and T4 may be n times (where n is an integer equal to or greater than 2) the length of the period T1.

In the third embodiment, as described above, periodicity of a musical sound signal during the period T1 and periodicity of a musical sound signal during the periods T2, T3, and T4 (of which lengths are twice, 4 times, and 8 times the length of T1) are added for evaluation. Further, the musical sound signal is separated into the high sound area and the low sound area, the periods T1 and T2 are evaluated using the musical sound signal of the high sound area, the periods T3 and T4 are evaluated using the musical sound signal of the low sound area. In general, since a musical instrument of a high sound area (for example, a hi-hat or the like) tends to be sounded at a fast tempo and a musical instrument of a low sound area (for example, a bass drum or the like) tends to be sounded at a slow tempo, determination of a tempo with higher precision than in the second embodiment is accordingly possible.

Specific details of the above-exemplified embodiments have been described. Table 1 is a table that shows progress of a piece of music which is an evaluation target. A tempo of the piece of music is assumed to be 120 BPM.

TABLE 1

| Music configuration | Musical instrument configuration |
|---|---|
| Intro: 8 beats | hi-hat (1 sound for 1 beat) + bass drum (1 sound for 1 beat) |
| Melody A: 4 beats | hi-hat (1 sound for 1 beat) + bass drum (1 sound for 1 beat) + piano (random tempo) |
| Melody B: 2 beats | hi-hat (1 sound for 2 beats) + bass drum (1 sound for 2 beats) + piano (random tempo) |
| Chorus: 4 beats | hi-hat (1 sound for 1 beat) + bass drum (1 sound for 1 beat) + piano (random tempo) |
| Melody C: 2 beats | hi-hat (1 sound for 2 beat) |
| End: 8 beats | hi-hat (1 sound for 1 beat) + bass drum (1 sound for 1 beat) + piano (random tempo) |

In an intro section, a tempo is estimated to be 120 BPM. Thereafter, when the piece of music is advanced to a section of Melody A or Melody B, a piano of which keys are stroked at random is added and a tempo of percussion is changed. Therefore, in a mathematical method, it is difficult to estimate a tempo correctly.

On the other hand, in a method according to the embodiments, when a tempo of a section of Melody A or B is estimated, an estimation result of the tempo in an intro section is added to perform cumulative evaluation. Thus, even when the piece of music is advanced after Melody A, an estimated tempo of the piece of music does not considerably deviate from 120 BPM consequently.

In a section of Melody C, percussion corresponds to 60 BPM and is performed. However, since an estimation result cumulative until now is added even in evaluation in the section of Melody C, an evaluation result of 120 BPM is maintained as a whole.

In this way, since the tempo detection part according to the embodiments cumulates results obtained by evaluating the plurality of sections and performs comprehensive evaluation, a tempo of a piece of music can be detected with higher precision than when a simple mathematical scheme is used. In other words, a tempo of a piece of music can be evaluated musically in consideration of advance of the piece of music.

Modification Examples

The foregoing embodiments are merely exemplary and the disclosure can be modified appropriately within the scope of the disclosure without departing from the gist of the disclosure. For example, the exemplary embodiments may be combined and realized.

For example, in the second embodiment, a musical sound signal may also be separated using a highpass filter and a lowpass filter. In this case, a musical sound signal input to an adaptive filter unit corresponding to a faster tempo may include a frequency component higher than that of a musical sound signal input to an adaptive filter unit corresponding to a slower tempo.

Figure 6B:
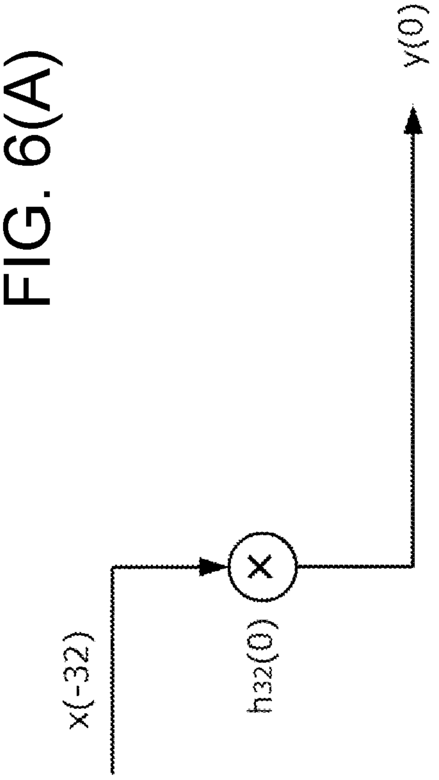

In the description of the embodiments, the plurality of sample groups included within the predetermined period (for example, a step 32 steps earlier to a step 63 steps earlier) have been input as input signals to the adaptive filter, but a target evaluated by an adaptive filter may be a single sample. In this case, the filter coefficient is a single value, as illustrated in FIG. 6(B). In the modification example, the converging filter coefficient is a value indicating "to what degree a delay width (for example, 32 steps) deviates from a tempo of a piece of music." Based on the converging filter coefficient, it may be determined whether the delay width corresponds to a tempo of the piece of music. For example, a plurality of filter coefficients may be acquired changing the delay width and a delay width with which the filter coefficient is the largest may be determined to correspond to a tempo of a piece of music.

In the second and third embodiments, the plurality of adaptive filter units have been used, but a single adaptive filter unit may be used in a time division manner.

In the description of the embodiments, the video recording part 201 has recorded the video signal and the video source selection part 202 has generated the output signal by combining the plurality of recorded videos. On the other hand, the tempo detection device 100 can also detect beats in real time. In this case, the tempo detection device 100 may generate tempo information whenever a beat is detected, and may transmit the tempo information to the video processing device 200 in real time. In this case, the tempo information is information indicating a beat appearance timing. The video processing device 200 may select a plurality of video sources based on the beat appearance timing notified of in real time without recording the video and may output the selected video source.

In the description of the embodiments, the adaptive filters have been used as parts obtaining similarity of a musical sound signal (between samples). However, when data indicating periodicity of a waveform of a musical sound signal can be acquired, similarity between samples may be obtained using a part other than the exemplified parts.

In the description of the embodiments, the tempo detection device 100 and the video processing device 200 are different devices, but hardware in which both the tempo detection device and the video processing device are integrated may be used.

In the description of the embodiments, the system in which the video processing device 200 switches between the plurality of cameras has been exemplified. However, the video processing device 200 may be omitted and the single tempo detection device 100 may be realized.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A video processing device, which inputs a piece of music and selects and outputs one video of a plurality of video sources, the video processing device comprising:
- a plurality of cameras disposed around a musical performer, each of the cameras is configured to image the musical performer to generate a video source;
- a processor configured as a music analyzing part, which analyzes a progress of the piece of music and configured as a video selecting part, which selects the one video from the plurality of video sources imaged from the cameras; and
- a display, which outputs the one video at a timing corresponding to the progress of the piece of music that has been analyzed by the processor.

2. The video processing device according to claim 1, wherein the processor analyzes the progress of the piece of music based on a configuration of the piece of music.

3. The video processing device according to claim 2, wherein analyzing the progress of the piece of music based on the configuration of the piece of music comprises analyzing the progress of the piece of music based on a beat progress of the piece of music.

4. The video processing device according to claim 3, wherein the piece of music is a real-time-input music.

5. The video processing device according to claim 4, wherein the analyzing performed by the processor comprises cumulatively evaluating samples of the real-time-input music.

6. The video processing device according to claim 5, wherein the processor analyzes the progress of the piece of music based on the beat progress.

7. The video processing device according to claim 6, wherein the processor sequentially selects the one video from the plurality of video sources.

8. The video processing device according to claim 7, wherein the plurality of video sources are real-time-input videos.

9. A video processing method, which inputs a piece of music and selects and outputs one video of a plurality of video sources, the video processing method comprising:
- imaging a musical performer by a plurality of cameras around the musical performer to generate the plurality of video sources;
- detecting an elapsed progress of the piece of music by a processor;
- selecting the one video by the processor from the plurality of video sources imaged from the cameras; and
- outputting the one video, which has been selected, at a timing corresponding to the elapsed progress of the piece of music that has been detected to a display.

10. The video processing method according to claim 9, wherein the piece of music is real-time-input music.

11. The video processing method according to claim 10, wherein the detecting of the elapsed progress of the piece of music is based on a beat progress of the piece of music.

12. The video processing method according to claim 10, wherein the detecting of the elapsed progress of the piece of music is based on a configuration progress of the piece of music.

13. The video processing method according to claim 10, wherein the selecting of the one video from the plurality of video sources comprises sequentially selecting the one video from the plurality of video sources.

14. The video processing method according to claim 13, wherein the detecting of the elapsed progress of the piece of music is based on a beat progress of the piece of music.

15. The video processing method according to claim 13, wherein the detecting of the elapsed progress of the piece of music is based on a configuration progress of the piece of music.

16. A video processing device, which input a sound and select and output one video from a plurality video sources, the video processing device comprising:

a sound input part, which inputs the sound;

a plurality of cameras disposed around a musical performer, each of the cameras is configured to image the musical performer to generate a video source;

a processor configured as a sound detection part, which detects a periodicity of the sound that has been input by the sound input part and configured as a video selection part, which selects the one video from the plurality of video sources that has been imaged by the cameras; and a display, which outputs the one video that has been selected by the processor at a timing corresponding to the periodicity of the sound that has been detected by the processor.

17. The video processing device according to claim 16, wherein the periodicity of the sound detected by the processor is a periodicity of a configuration of music of the sound.

18. The video processing device according to claim 17, wherein the periodicity of the configuration of music of the sound is a periodicity of a beat of the sound.

19. The video processing device according to claim 18, wherein the video selection part sequentially selects the one video from the plurality of video sources.

20. The video processing device according to claim 16, wherein the sound input part is means for inputting a real time sound received by a microphone, and the cameras are configured to image real time video.

* * * * *